United States Patent [19]
Edwards

[11] 4,101,109
[45] Jul. 18, 1978

[54] LOUDSPEAKER HARNESS

[76] Inventor: Aubrey John Edwards, 7987 Gilley Ave., Burnaby, British Columbia, Canada

[21] Appl. No.: 750,522

[22] Filed: Dec. 14, 1976

[51] Int. Cl.² .............................................. B65C 1/12
[52] U.S. Cl. ..................................... 248/317; 294/74; 206/453
[58] Field of Search ....................... 248/317, 318, 323; 294/74; 224/45 F, 49, 55; 206/453, 597

[56] References Cited

U.S. PATENT DOCUMENTS

| | | | |
|---|---|---|---|
| 1,327,680 | 1/1920 | Leahy | 224/49 |
| 1,690,824 | 11/1928 | Kondolf | 206/453 |
| 2,510,674 | 6/1950 | Andersen | 294/74 |
| 2,676,835 | 4/1954 | McKinney | 294/74 |
| 2,793,904 | 5/1957 | Gale | 294/74 |
| 3,482,759 | 12/1969 | Ortiz | 206/453 |
| 3,743,341 | 7/1971 | Gale | 294/74 |

*Primary Examiner*—Marion Parsons, Jr.
*Attorney, Agent, or Firm*—Carver and Company

[57] ABSTRACT

A loudspeaker harness for supporting a generally rectangular sectioned loudspeaker having at least four vertical walls and two horizontal walls intersecting at edges to form eight corners. Harness has a pair of longitudinal links passing under bottom wall of housing and extending upwardly adjacent opposed vertical walls, with at least one link cooperating with a support to hang loudspeaker therefrom. Upper and lower circumferential links pass around the four vertical walls to form two loops enclosing housing generally adjacent top and bottom walls. Eight corner pocket members cooperate with the links, one pocket member being fitted at each corner of the housing to restrict relative movement between one longitudinal link and one circumferential link adjacent the particular corner to maintain the links in desired positions relative to the housing. One example of a pocket member includes three generally triangular portions which intersect each other along two adjacent edges of each portion to form a figure of generally tetrahedral shape having three closed sides and one open side which form a pocket complementary to the corner.

5 Claims, 5 Drawing Figures

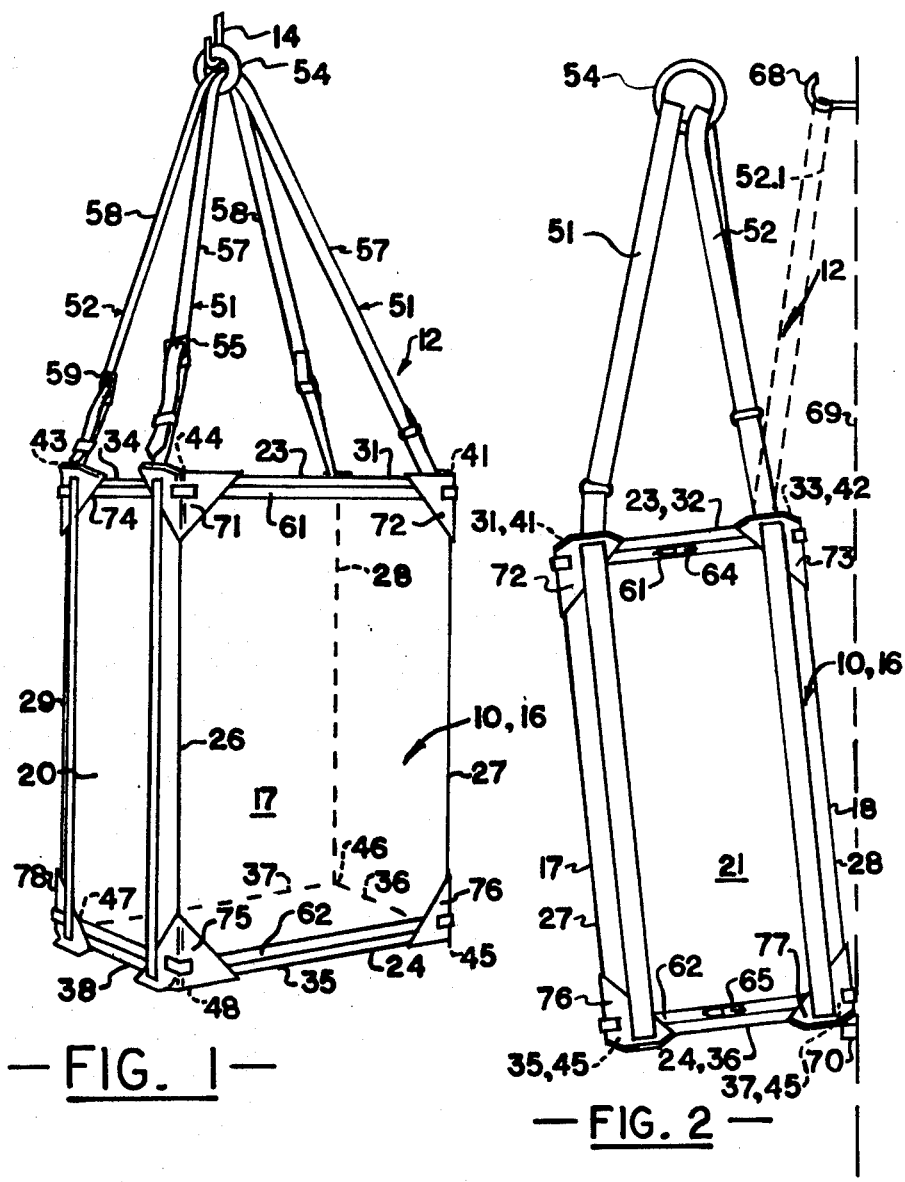
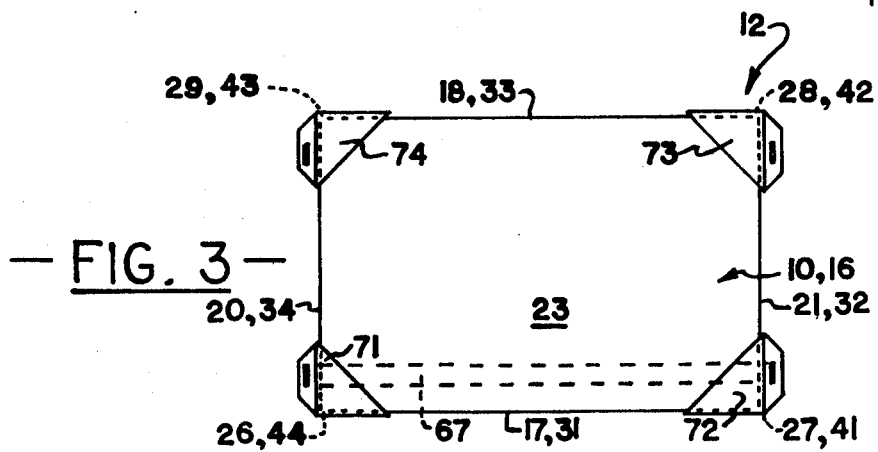

LOUDSPEAKER HARNESS

BACKGROUND OF THE INVENTION

1. Field of the Invention

The invention relates to a harness particularly adapted for supporting a loudspeaker as used in stereophonic music reproduction systems.

2. Prior Art

Stereophonic music reproduction systems, commonly called stereos, use at least two loudspeakers spaced a suitable distance apart from each other and connected to an amplifier which receives signals from a record player, tape deck or the like. Commonly each loudspeaker includes one or more separate loudspeaker transducer units mounted in a blox-like housing placed on the floor, or preferably on a means for supporting the housing above the floor such as a bookshelf or a table etc. Spacing between the speakers is important and commonly furniture in the room must be re-arranged to accommodate the speakers for optimum stereophonic effect. Most loudspeaker housings are costly and relatively delicate and are vulnerable to damage inflicted by children or household pets, and thus it can be difficult to decide where to place the loudspeakers to reduce their vulnerability, whilst displacing furniture in the room minimally, and yet still provide optimum stereophonic effect.

SUMMARY OF THE INVENTION

The present invention reduces some of the difficulties and disadvantages of the prior art by providing a harness for supporting loudspeakers to hang from the ceiling or other high support which permits the loudspeakers to be positioned at an essentially optimum stereophonic spacing with reduced vulnerability to damage that might otherwise be inflicted by children and household pets. Furthermore there is no need for special furniture supporting the loudspeakers and usually existing furniture does not need to be re-arranged.

A loudspeaker harness according to the invention is for supporting a loudspeaker having a housing with at least four generally vertical walls, namely front and rear walls and a pair of spaced side walls, and two horizontal walls, namely top and bottom walls. The walls of the housing intersect at four generally vertical edges and eight generally horizontal edges so that the housing has at least eight corners, each corner being positioned at an intersection between two horizontal edges and one vertical edge. The harness is characterized by first and second longitudinal links passing under the bottom wall of the housing and extending upwardly adjacent opposed vertical walls, at least one link extending to an upper link portion adapted to cooperate with a support to hang the loudspeaker therefrom. The harness also includes upper and lower circumferential links passing around the four vertical walls to form two loops enclosing the housing and being disposed within spaced generally horizontal planes positioned generally adjacent the top and bottom walls respectively. The harness also includes eight corner pocket members, one member being fitted at each corner of the housing to engage the corner of the housing and to cooperate with, and to restrict relative movement between, one longitudinal link and one circumferential link adjacent the particular corner to maintain the links in a desired position relative to the housing.

A detailed disclosure following related to drawings, describes a preferred embodiment of the invention which is capable of expression in structure other than that particularly described and illustrated.

DESCRIPTION OF THE DRAWINGS

FIG. 1 is a perspective of a loudspeaker supported by a harness according to the invention, some hidden detail being shown in broken lines, FIG. 2 is a simplified side elevation of the harness supporting a loudspeaker in an inclined position, an alternative means of supporting the loudspeaker also being shown, FIG. 3 is a simplified top plan of the harness supporting a loudspeaker, some links being ommited, position of a link being shown for the alternative means of supporting the loudspeaker.

DETAILED DISCLOSURE

FIGS. 1 - 3

Figure 4:
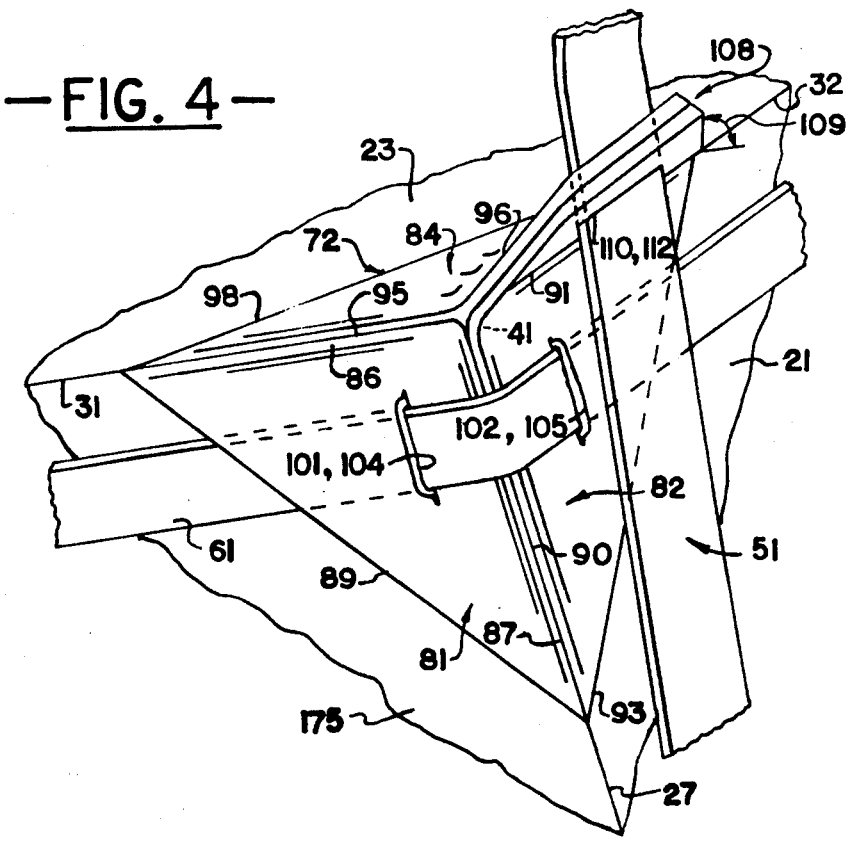
FIG. 4 is a simplified perspective of a corner pocket member used in the harness, cooperation with two links being shown.

A loudspeaker 10 is supported by and enclosed in a harness 12 according to the invention, the harness hanging from a hook 14 screwed into the ceiling of a room, or other relatively high support, not shown. The loudspeaker has a housing 16 having four generally vertical walls, namely front and rear walls 17 and 18 and a pair of spaced side walls 20 and 21. The front wall is generally fitted with an acoustical fabric facing to pass sound waves from one or more loudspeaker transducer components, not shown, mounted within the housing. The housing also has two horizontal walls, namely top and bottom walls 23 and 24, and the six walls intersect adjacent walls at four generally vertical edges 26 through 29, and eight generally horizontal edges 31 through 38. The housing has eight corners 41 through 48, each corner being positioned at an intersection between two horizontal edges and one vertical edge, for example the corner 41 is located at an intersection of the edges 31, 32 and 27.

The harness 12 has first and second longitudinal links 51 and 52 which are generally similar and extend upwardly and pass around a ring 54 hanging from the hook 14. Ends of the link 51 are joined by a buckle 55 so as to form a loop, the buckle permitting easy adjustment of length of the loop. The link passes under the bottom wall 24 and extends upwardly adjacent the opposed vertical side walls 20 and 21 to an upper link portion 57 which passes over the ring 54. The link 52 similarly passes under the bottom wall and extends upwardly adjacent the opposed vertical side walls to an upper portion 58 to cooperate similarly with the ring 54. Ends of the link 52 are similarly connected at a buckle 59 for easy length adjustment. Thus both links cooperate with the ring and the hook which serve as a support to hang the loudspeaker therefrom and, if desired, the ring 54 can be omitted and the loops could then pass directly over the hook.

The harness includes upper and lower circumferential links 61 and 62 which pass around the four vertical walls 17, 18, 20 and 21 to form two loops enclosing the housing. The links 61 and 62 have ends which are joined by buckles 64 and 65 respectively to form the two loops which are disposed within spaced generally horizontal planes positioned generally adjacent the top and bottom walls 23 and 24 respectively. The harness also includes eight similar corner pocket members 71 through 78, one member being fitted at each corner of the housing to engage the corner of the housing. The corner pocket members cooperate with the links and corners as will be described with reference to FIG. 4 to maintain the links in a desired position relative to the housing.

FIGS. 4

The corner pocket member 72 has first and second vertical portions 81 and 82 fitted against the two vertical walls 17 and 21 respectively at the corner 41, and a horizontal portion 84 fitted against the top wall 23. The three portions form a pocket generally complementary to the corner 41 so that when the pocket is held against the corner it restricts movement of the housing relative to the links. The portion 81 is an isosceles triangle having two equal inner sides 86 and 87 and a hypotenuse 89 on an outer side thereof. The portion 82 has similar equal inner sides 90 and 91 and a hypotenuse 93, and the horizontal portion 84 has similar inner sides 95 and 96 and a hypotenuse 98. The inner sides 95 and 96 of the portion 84 coincide with the inner sides 86 and 91 of the portions 81 and 82 respectively. Similarly the inner sides 87 and 90 of the portions 81 and 82 are also coincident. Thus it can be seen that the three portions of the corner pocket members are triangular and intersect each other along two adjacent sides of each portion to form a figure of generally tetrahedral shape having three closed sides and one open side. The vertical portions 81 and 82 have elongated slits 101 and 102 which form openings of sufficient size to accept the circumferential link 61 threaded therethrough so as to form respective circumferential link engaging means 104 and 105.

A tang 108 extends outwardly from an intersection of the inner side 96 of the horizontal portion 84 with the inner side 91 of the vertical portion 82. The tang extends outwardly at an angle 109 which is about 45° to the horizontal, and has an elongated slot 110 therein to form a longitudinal link engaging means 112 to accept the longitudinal link 51 threaded therethrough. Each corner member is generally similar and thus it can be seen that vertical portions of each corner member have circumferential link engaging means to cooperate with a respective circumferential link, and a longitudinal link engaging means to cooperate with a respective longitudinal link. The members thus restrict relative movement between one longitudinal link and one circumferential link adjacent a particular corner so as to maintain the links in a desired position relative to the housing to prevent the links moving excessively which might otherwise cause the loudspeaker to fall out of the harness.

Figure 5:
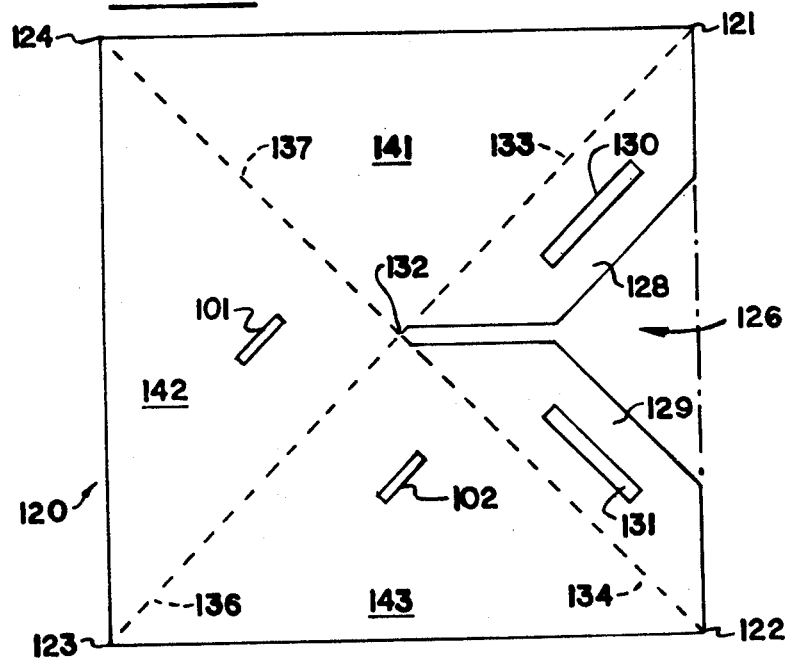
FIG. 5 is a simplified plan view of a prepared blank of flexible sheet material prior to forming the corner pocket member therefrom.

The corner pocket member can be made from an injected plastic with the portions thereof having walls of about 0.1 inch thick for portions having hypotenuses of about four inches. The slits have a length and a width sufficient to accept the longitudinal and circumferential links which are suitably flexible straps of about one inch width for the longitudinal links, and of about 0.5 inch width for the circumferential links. Preferably the longitudinal links 51 and 52 are wider than the circumferential links 61 and 62 for aesthetic as well as practical reasons. Relatively narrow circumferential links passing in front of the loudspeaker effect performance minimally, and also require proportionately short slits 101 and 102 in the vertical portions of the corner pocket members. The tang 108 is long enough to tolerate a proportionately long slit to accept one of the relatively wide longitudinal links. By using a tang with a slit, it is also easier to thread and pull the link through the opening because the link is not sandwiched between the housing and pocket member, which would be the case if it passed through a slit in the triangular portions. Thus the opening in the tang is longer than the opening in the vertical portion so that relatively small corner pocket members can be made, thus reducing cost and reducing loudspeaker obstruction. Alternatively, for a more aesthetically pleasing harness, the corner portions can be formed from stout leather which can be made as described with reference to FIG. 5.

FIG. 5.

The corner portion 72 is formed from a generally square sheet of flexible material 120, suitably leather, the sheet having four outwardly extending corners, namely first and second corners 121 and 122, and third and fourth corners 123 and 124. The sheet has a generally triangular cut-out 126 in one edge thereof defined by opposed diverging flaps 128 and 129, the flaps having along inner edges thereof first and second folds 133 and 134 extending outwardly from a center 132 of the sheet to the first and second corners 121 and 122 respectively. The folds 133 and 134 are shown in broken outline and the sheet is folded along two further folds, namely third and fourth folds 136 and 137 extending from the center 132 to the third and fourth corners 123 and 124 respectively. Thus three essentially equal isosceles triangles are formed, namely first, second and third triangles, 141, 142 and 143. The second triangle 142 has two sides, namely the folds 137 and 136, common to one side of each of the first and third triangles 141 and 143. The second and third triangles have the elongated slits 102 and 101 respectively to form the circumferential link engaging means of FIG. 2 as will be described, and the flaps 128 and 129 have openings 130 and 131 respectively of form the longitudinal link engaging means 112 as will be described.

When the sheet 120 is folded into the shape as shown in FIG. 4, the first, second and third triangles form the horizontal portion 84 and the two vertical portions 81 and 82 respectively of the corner member. The two flaps 128 and 129 are secured against each other by stitching or adhesive to form the tang 108 and the respective openings 130 and 131 in the flaps come into register with each other to form the elongated slit 110 of the longitudinal link engaging means 112. When the member is assembled correctly, the slits 101 and 102 in the second and third triangles are disposed to accept the circumferential link 61 threaded therethrough, and the structure forms an unobtrusive decoration for a corner of a loudspeaker housing. Clearly the tang can be repositioned to extend from a vertical edge with a re-positioning of elongated slits to accept the longitudinal links. Alternatively, other link engaging means can be substituted.

OPERATION

A wide variety of different sizes of loudspeaker housings can be fitted within the harness according to the invention, provided the housing has at least eight corners disposed within two spaced planes. As most housings are rectangular blocks, little difficulty in fitting is encountered. Initially, four corner pocket members are threaded onto each circumferential link which passes around the housing adjacent the top or bottom walls. Thus buckles 64 and 65 are adjusted so that tension in the loops so formed is sufficient to hold the corner pocket members snuggly onto the corners. Each longitudinal link is then threaded in sequence through the elongated slits in the tangs in the respective four pocket members, and then threaded through the ring 54 if this is to be used. Relative lengths of the longitudinal links are adjusted for vertical hanging of the loudspeaker, or to permit tilting of the loudspeakers for directing sound as required for such tilting being shown in FIG. 2.

ALTERNATIVES AND EQUIVALENTS
FIGS. 2 and 3

Alternative means of securing the harness and supporting the loudspeaker are available. For example, the first longitudinal link can be unthreaded from the ring 54 and made shorter so that ends thereof are joined together so that an upper run 67 of the link 57 extends along the top wall 23 of the housing, as shown in broken outline in FIG. 3. The first link thus ties the circumferential links to the housing and the second link 52, assumes rearward inclination 52.1 and cooperates with an alternative hook 68 secured in a vertical wall 69, the inclination of the link 52.1, the hook 68 and wall 69 being shown in broken outline. A support 70 is secured to the wall below the hook 68 and carries a portion of the weight of the loudspeaker and permits adjustment of angle of inclination of the loudspeaker. Alternatively, the second link 52 can be disconnected and shortened to pass along the top wall 23 with the first link 51 passing upwardly to a hook etc. In any event, at least one longitudinal link extends to an upper link portion thereof to cooperate with a support to hang the loudspeaker therefrom.

I claim:
1. A loudspeaker harness for supporting a loudspeaker, the loudspeaker including a housing having: at least four generally vertical walls, namely front and rear walls and a pair of spaced side walls, and two horizontal walls, namely top and bottom walls, the walls intersecting at four generally vertical edges and eight generally horizontal edges; the housing also having at least eight corners, each corner being positioned at an intersection between two horizontal edges and one vertical edge; the harness being characterized by:
   (a) first and second longitudinal links passing under the bottom wall of the housing and extending upwardly adjacent opposed vertical walls, at least one link extending to an upper link portion adapted to cooperate with a support to hang the loudspeaker therefrom,
   (b) upper and lower circumferential links passing around the four vertical walls to form two loops enclosing the housing and being disposed within spaced generally horizontal planes positioned generally adjacent the top and bottom walls respectively,
   (c) eight corner pocket members, one member being fitted at each corner of the housing to engage the corner of the housing and to cooperate with, and to restrict relative movement between, one longitudinal link and one circumferential link adjacent the particular corner, and in which each corner pocket member includes:
      (i) first and second vertical portions to fit against the two vertical walls intersecting at the corner, each vertical portion having an opening having a size sufficient to accept the circumferential link threaded therethrough so as to form circumferential link engaging means,
      (ii) a horizontal portion to fit against the horizontal wall intersecting the two vertical walls at the particular corner, the three portions intersecting each other along sides thereof to form a pocket generally complementary to the corner of the housing to restrict movement of the housing relative to the links,
      (iii) a tang extending outwardly from an intersection of the horizontal portion with one vertical portion, the tang having an opening therein to form a longitudinal link engaging means to accept the longitudinal link threaded therethrough, so as to maintain the links in a desired position relative to the housing.

2. A loudspeaker harness as claimed in claim 1 in which:
   (a) the two vertical portions and horizontal portion of each corner pocket member are generally triangular and intersect each other along two adjacent sides of each portion to form a figure of generally tetrahedral shape having three closed sides and one open side.

3. A loudspeaker harness as claimed in claim 2 in which
   (a) a corner portion is formed from a generally square sheet of flexible material having four outwardly extending corners, and a generally triangular cutout in one edge thereof defined by opposed diverging flaps, folds of the flaps extending outwardly from a center of the sheet to first and second corners, each flap having an opening therein, the sheet also being folded along two folds extending from the center to third and fourth corners to form three essentially equal triangules, namely first, second and third triangles, the second triangle having two sides common to one side of each of the first and third triangles, the second and third triangles having openings therein to form the circumferential link engaging means,
so that when the sheet is folded, the two diverging flaps are held against each other to form the tang with the respective openings in the flaps being in register to form the longitudinal link engaging means to accept the longitudinal link threaded therethrough, the openings in the second and third triangles being disposed to accept one circumferential link threaded therethrough.

4. A loudspeaker harness as claimed in claim 3 in which:
   (a) the longitudinal and circumferential links are flexible straps,
   (b) the openings in the vertical portions and tangs of the corner members are elongated slits having lengths sufficient to accept the respective straps.

5. A loudspeaker harness as claimed in claim 1 in which:
   (a) the longitudinal links are wider than the circumferential links,
   (b) the opening in the tang is longer than the opening in the vertical portion.

* * * * *